US007979714B2

(12) United States Patent
Borsa et al.

(10) Patent No.: US 7,979,714 B2
(45) Date of Patent: Jul. 12, 2011

(54) AUTHENTICATION AND ACCESS CONTROL DEVICE

(75) Inventors: Bruce T. Borsa, Geneva, NY (US); Michael T. Kurdziel, Rochester, NY (US); Jeffrey I. Murray, Penfield, NY (US); Terence W. O'Brien, Webster, NY (US)

(73) Assignee: Harris Corporation, Melbourne, FL (US)

( * ) Notice: Subject to any disclaimer, the term of this patent is extended or adjusted under 35 U.S.C. 154(b) by 992 days.

(21) Appl. No.: 11/445,571

(22) Filed: Jun. 2, 2006

(65) Prior Publication Data

US 2007/0283159 A1 Dec. 6, 2007

(51) Int. Cl.
*H04L 9/00* (2006.01)

(52) U.S. Cl. ......... 713/182; 713/179; 713/175; 380/279

(58) Field of Classification Search .............. 380/1, 255, 380/264, 277; 713/282, 289; 726/26, 27, 726/28, 29, 30

See application file for complete search history.

(56) References Cited

U.S. PATENT DOCUMENTS 4,227,253 A 10/1980 Ehrsam et al.
4,493,031 A 1/1985 Silverio
4,918,728 A 4/1990 Matyas et al.
5,263,168 A 11/1993 Toms et al.
5,283,828 A 2/1994 Saunders et al.
5,369,702 A 11/1994 Shanton
5,548,646 A 8/1996 Aziz et al.
5,596,718 A 1/1997 Boebert et al.
5,748,744 A 5/1998 Levy et al.
5,802,178 A 9/1998 Holden et al.
5,887,064 A * 3/1999 Seysen .......................... 713/172
5,956,404 A 9/1999 Schneier et al.
6,072,202 A 6/2000 Naniwae
6,081,895 A 6/2000 Harrison et al.
6,148,401 A 11/2000 Devanbu et al.
6,282,653 B1 8/2001 Berstis et al.
6,351,817 B1 2/2002 Flyntz
6,378,071 B1 4/2002 Sasaki et al.
6,378,072 B1 4/2002 Collins et al.
6,671,804 B1 * 12/2003 Kent ............................ 713/175
6,775,778 B1 8/2004 Laczko et al.

(Continued)

FOREIGN PATENT DOCUMENTS

DE 196 33 919 6/1997

(Continued)

OTHER PUBLICATIONS

Schneier, Applied Cryptography Second Edition, 1996, John Wiley & Sons, Second Edition, pp. 513-514.

(Continued)

*Primary Examiner* — Vivek Srivastava
*Assistant Examiner* — Nega Woldemariam
(74) *Attorney, Agent, or Firm* — Fox Rothschild, LLP; Robert J. Sacco

(57) ABSTRACT

Authentication and access control device (104) includes a first security key sub-system (110, 112, 114, 116, 118). The first security key sub-system is responsive to an input signal for providing a first key code required for permitting a user access to a controlled resource. The device advantageously also includes a second security key sub-system (110, 112, 114, 116, 118) for providing a second key code different from the first key code. The second key code is useful for authenticating the user or facilitating secure use of a particular controlled resource (102).

20 Claims, 4 Drawing Sheets

U.S. PATENT DOCUMENTS

| | | | |
|---|---|---|---|
| 7,003,674 B1 | 2/2006 | Hamlin | |
| 7,028,149 B2 | 4/2006 | Grawrock et al. | |
| 7,047,405 B2 | 5/2006 | Mauro | |
| 7,069,447 B1 | 6/2006 | Corder | |
| 7,302,698 B1 | 11/2007 | Proudler et al. | |
| 7,322,042 B2 | 1/2008 | Srinivasan et al. | |
| 7,380,275 B2 | 5/2008 | Srinivasan et al. | |
| 7,392,398 B1 | 6/2008 | Shakkarwar | |
| 7,765,399 B2 | 7/2010 | O'Brien et al. | |
| 7,779,252 B2 | 8/2010 | O'Brien et al. | |
| 2001/0044886 A1 | 11/2001 | Cassagnol et al. | |
| 2002/0059238 A1 | 5/2002 | Saito | |
| 2002/0099950 A1 | 7/2002 | Smith | |
| 2002/0138548 A1 | 9/2002 | Neebe et al. | |
| 2003/0046589 A1 | 3/2003 | Gregg | |
| 2003/0126434 A1 | 7/2003 | Lim et al. | |
| 2003/0163740 A1 | 8/2003 | Thjai et al. | |
| 2003/0204801 A1 | 10/2003 | Tkacik et al. | |
| 2004/0039924 A1 | 2/2004 | Baldwin et al. | |
| 2004/0044902 A1 | 3/2004 | Luthi | |
| 2004/0103288 A1 | 5/2004 | Ziv et al. | |
| 2005/0055524 A1 | 3/2005 | Gulick et al. | |
| 2005/0114687 A1 | 5/2005 | Zimmer et al. | |
| 2005/0132186 A1 | 6/2005 | Khan et al. | |
| 2005/0273602 A1 | 12/2005 | Wilson et al. | |
| 2006/0041755 A1* | 2/2006 | Pemmaraju | 713/182 |
| 2006/0059345 A1 | 3/2006 | Fayad et al. | |
| 2006/0078109 A1 | 4/2006 | Akashika et al. | |
| 2006/0105740 A1 | 5/2006 | Puranik | |
| 2006/0195907 A1 | 8/2006 | Delfs et al. | |
| 2006/0248599 A1 | 11/2006 | Sack et al. | |
| 2006/0251258 A1* | 11/2006 | Lillie et al. | 380/270 |
| 2006/0253711 A1* | 11/2006 | Kallmann | 713/186 |
| 2007/0214364 A1* | 9/2007 | Roberts | 713/179 |
| 2007/0226493 A1 | 9/2007 | O'Brien et al. | |
| 2007/0226494 A1 | 9/2007 | O'Brien et al. | |
| 2007/0226517 A1 | 9/2007 | O'Brien et al. | |
| 2007/0250411 A1* | 10/2007 | Williams | 705/28 |
| 2008/0022136 A1 | 1/2008 | Mattsson et al. | |

FOREIGN PATENT DOCUMENTS

| | | |
|---|---|---|
| EP | 0 471 538 | 2/1992 |
| EP | 0657 820 | 6/1995 |
| EP | 1 085 396 | 3/2001 |
| GB | 2336005 | 10/1999 |
| WO | WO 98/39876 | 3/1998 |

OTHER PUBLICATIONS

Wiki: "Multilevel Security" Wikipedia, [online] Retrieved from the internet: URL://HTTP://en.wikipedia.orq/w/index.php?title=Multilevel_secuirty&oldid=44733265> [retrieved on Aug. 9, 2007].

* cited by examiner

AUTHENTICATION AND ACCESS CONTROL DEVICE

BACKGROUND OF THE INVENTION

1. Statement of the Technical Field

The inventive arrangements concern secure processing systems, and more particularly apparatus for providing authentication and access control to secure processing systems.

2. Description of the Related Art

Users of secure processing systems are increasingly demanding improved methods for ensuring authentication of users and controlled access to secure systems. Presently, a variety of systems exist for enabling or accessing secure processing systems based on user identification. For example, some systems rely on user passwords for security. Other systems currently in use include biometric scanning, crypto ignition keys (CIK), and common access control (CAC) cards. Still other systems require that cryptographic keys be inserted into a host system in order for the system to send, receive and process secure information. However, it will be appreciated that there are limits to the level of security that each of the foregoing techniques can achieve on its own.

Further, many conventional systems used for authentication of users and for controlling access to secure processing systems generally require physical contact with an information processing system. For example, such physical contact can include card readers or biometric scanners that are wired to the processing system, or an electrical cable that is used to insert a CIK. Moreover, conventional systems usually rely on single mode of access control. For example, a conventional CAC card is used for common access control to a facility, but does not provide biometric scanning. Similarly, conventional biometric scanning devices identify an individual, but do not combine such features with the benefit of a functional CIK.

SUMMARY OF THE INVENTION

The invention concerns an authentication and access control device for providing access to a controlled resource. According to one aspect of the invention, the controlled resource is be a data processing device. For example, the data processing device can be a mobile computing system or personal electronic device.

The authentication and access control device includes a first security key sub-system. The first security key sub-system is responsive to an input signal for providing a first key code required for permitting a user access to a controlled resource. The device advantageously also includes a second security key sub-system including at least one electronic circuit for providing a second key code different from the first key code. According to one aspect of the invention, the second key code is used for authenticating the user or can be otherwise useful for secure use of the particular resource.

The device also includes a wireless communication system. The wireless communication system includes at least one wireless transmitter. The wireless transmitter is coupled to at least one of the first security key sub-system and the second security key sub-system. With the foregoing system, the first key code and the second key code are communicated wirelessly to the controlled resource. In this way, the one or more wireless signals is used to enable functionality and/or user access provided by the controlled resource. The first and second key codes can be transmitted as part of a single wireless signal transmission, or can be transmitted separately.

According to an aspect of the invention, the first security key sub-system is selected from the group consisting of (1) a biometric scanner, (2) a keypad configured for entry by a user of at least one of alpha and numeric data, (3) a data store containing a personal identification code for a particular user, (4) a data store containing a cryptographic fill key, and (5) a data store containing a cryptographic ignition key. The second security key sub-system is advantageously selected from the same group. However, the second security key sub-system will generally be a different one of the listed alternatives as compared to the security key sub-system selected for the first security key sub-system.

In the first and second security key sub-systems, if a biometric scanner is used, then the biometric scanner determines the first or second key code based on a biometric scan of a user. Alternatively, if the first or second security key sub-system is a keypad configured for entry by a user of alpha numeric data, then the first or second key code would be some predetermined password entered by a pattern of keystrokes inputted by a user.

If the first or second security key subsystem includes a data store containing a cryptographic key, then the cryptographic key is the key code for that sub-system. According to an aspect of the invention, the cryptographic key is a cryptographic fill key that is predetermined for enabling cryptographic data processing to be performed using the controlled resource. If the first or second security key sub-system includes a data store that contains a cryptographic ignition key, then the key code for that sub-system can be the cryptographic ignition key. The cryptographic ignition key is used to enable at least one data processing function of the controlled resource.

The authentication and access control device of the present invention is not limited to the first and second security key sub-systems. Instead, one or more additional security key subsystems can be provided. All of the security keys are communicated wirelessly to the controlled resource. The third security key sub-system is also be selected from the group consisting of (1) a biometric scanner, (2) a keypad configured for entry by a user of at least one of alpha and numeric data, (3) a data store containing a personal identification code for a particular user, (4) a data store containing a cryptographic fill key, and (5) a data store containing a cryptographic ignition key. The third security key sub-system is advantageously selected so that it is different or exclusive of a security key sub-system selected for the first and second security key sub-systems.

According to yet another aspect of the invention, the authentication and access control device includes a first security key sub-system that includes a biometric scanner. The biometric scanner is used for generating a first key code containing information required for permitting a user access to a controlled resource, such as a personal electronic device. Further, a wireless communication system is provided that includes at least one wireless transmitter coupled to the first security key sub-system for wirelessly transmitting the first key code to the personal electronic device.

The biometric scanner system is advantageously combined with at least a second security key sub-system for generating a second key code different from said first key code. The second key code is provided for authenticating the user to the personal electronic device or enabling a data processing function of the personal electronic device. For example, the second security key sub-system can be selected from the group consisting of (1) a keypad configured for entry by a user of at least one of alpha and numeric data, (2) a data store containing a personal identification code for a particular user, (3) a data store containing a cryptographic fill key, and (4) a data store containing a cryptographic ignition key.

DETAILED DESCRIPTION OF THE PREFERRED EMBODIMENTS

Figure 1:
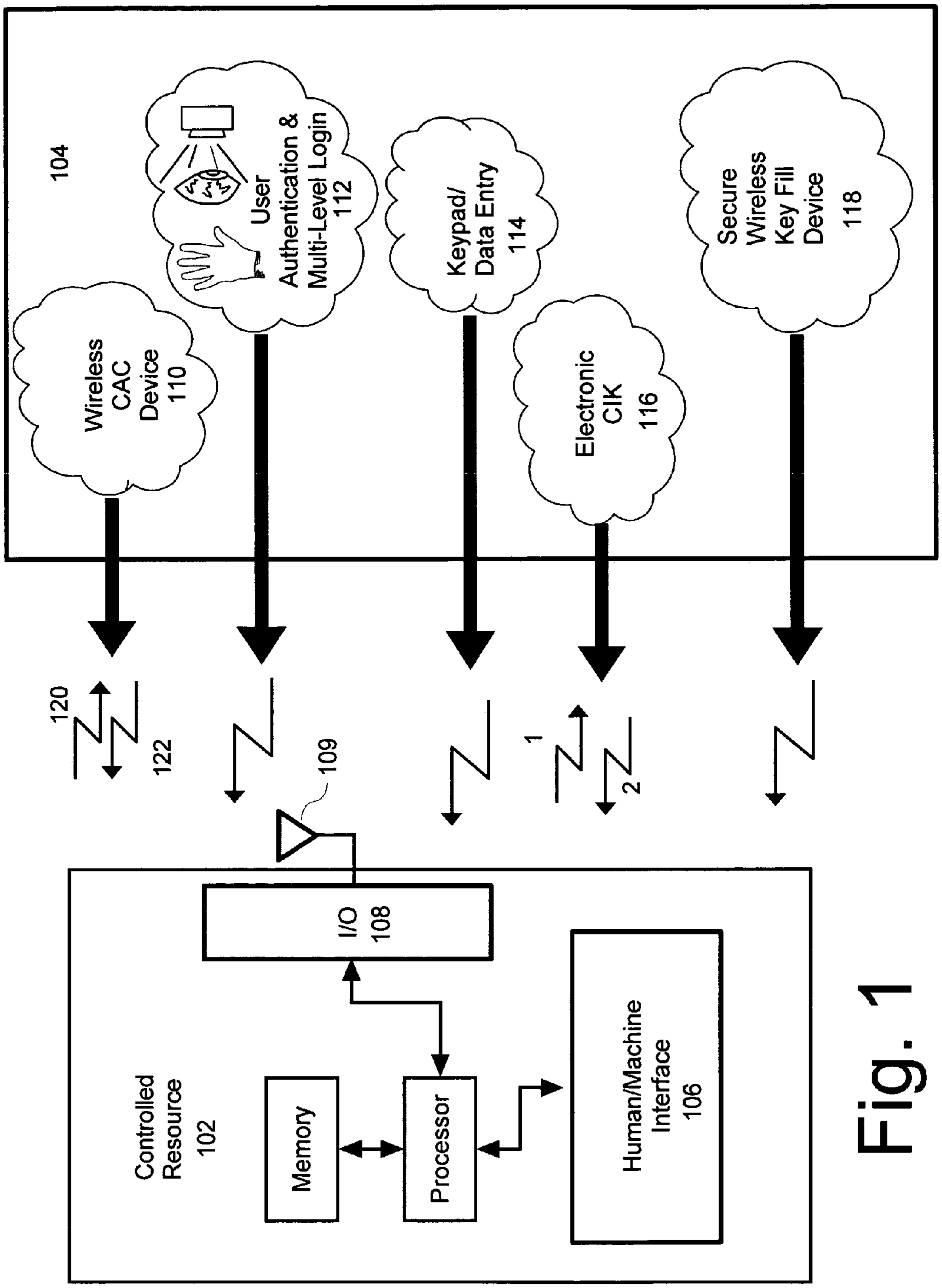
FIG. 1 is a block diagram that is useful for understanding a wireless authentication and access control device.

The present invention concerns an authentication and access control device (AACD) for providing access to a controlled resource. Referring to FIG. 1, there is shown a controlled resource 102 that can be accessed using the AACD 104. The controlled resource 102 can be a secure information processing system. Alternatively, the controlled resource can be an electronic security system that provides perimeter physical access control to a secure area.

The controlled resource 102 can include several components. These components can include a human/machine interface 106 and an input/output (I/O) system 108 for communicating data into and out of the device. The human/machine interface 106 can include a keypad for data entry and an LCD or other type of display screen. Advantageously, the I/O system 108 can include a wireless interface. I/O system 108 can be connected to a suitable transducer 109 for wireless communications. If the I/O system is RF based, the transducer can be an antenna. If the system is optically based, a suitable optical transducer can be used. Alternatively, any other suitable wireless transducer can be used. The wireless interface can be based on any of a variety of well known wireless interface standards. Examples of such well known wireless interface standards can include the Bluetooth wireless standard, and the IEEE 802.11 family of standards. However, the invention is not limited in this regard and any other wireless interface standard can be used.

According to one embodiment of the invention, the secure information processing system can be a personal electronic device. Personal electronic devices (PEDs) are well known in the art. For example mobile handheld computers, which are sometimes called personal digital assistants or PDAs, have the ability to store, process and communicate data. PDAs generally fall into one of several categories which can include handheld PCs, palm size PCs, smart phones, and handheld instruments. PDAs typically include some kind of microprocessor with a commercially available operating system such as Linux, Palm OS, or Widows CE (Pocket PC). Many PDAs also have built in LCD displays, touch sensitive screens, and keypads for the human/machine interface. Some PDAs also include wireless networking capabilities. For example, many such devices can communicate with other devices using well known wireless networking. The foregoing capabilities make these compact devices highly useful for various business and personal applications. It is anticipated that recent developments in PDA technology will increasingly facilitate secure processing on these types of devices.

If the controlled resource 102 is an electronic security system that is used to secure physical access to a perimeter, then the controlled resource can be linked to one or more electronically controlled locks (not shown). Other control and surveillance systems, such as video cameras and/or other types of surveillance sensors, can also be used to provide perimeter physical access control. Still, it will be appreciated that the invention is not limited to any particular type of controlled resource.

Referring once again to FIG. 1, it can be observed that the AACD 104 can include one or more sub-systems 110, 112, 114, 116, 118 that are useful for authentication and access control. According to an embodiment of the invention, the AACD 104 can include at least two sub-systems that facilitate either (1) user authentication or (2) access control with respect to a controlled resource 102. The two sub-systems can be entirely separate from one another within the AACD. According to a preferred embodiment, however, the sub-systems can share one or more common hardware and/or software elements. For example, the two sub-systems can be under the control of a common microprocessor or microprocessor device, can share memory facilities, I/O facilities, antennas, and other resources.

According to one embodiment of the invention, each security sub-system which is implemented on the AACD 104 can generate and transmit at least one key code that is associated with that particular sub-system. For example, a first sub-system 110 can include a personal identification code that is associated with a particular user. In this regard, the first sub-system can be similar to conventional common access control cards that are swiped, scanned or otherwise designed to respond to a conventional stimulus signal for generating a security code. Consequently, for this type of sub-system the key code can be any particular code that can be associated with a specified user.

The sub-system 110 can be useful for automatically limiting access to the controlled resource. For example, in response to an interrogation signal 120, the security key sub-system 110 can transmit a key code associated with a particular user. When the key-code is received by the controlled resource 102, it can determine whether the user has privileges to use or access the controlled resource.

Notwithstanding the advantages of central access control type devices which can be included as part of sub-system 110, those devices have their limitations. For example, with a CAC type device, the controlled resource 102 can determine that an individual is present with MCD 104 that has generated a valid user key code. However, the controlled resource cannot know whether the user who possesses the device is the legitimate owner or authorized user of the MCD. Accordingly, it can be advantageous to combine the sub-system 110 with at least a second sub-system. For example, the second sub-system can be used to authenticate that the individual possessing the MCD 104 is in fact the person who is authorized to use the MCD. One method to accomplish such authentication would be to include a biometric scanner sub-system 112 as part of the MCD 104. Another method would be to include a keypad 114 or other data entry device as part of the MCD 104 to allow a user to enter a user password.

Stated in more general terms, a first one of the security key sub-systems 110, 112, 114, 116, 118 can be selected from the group consisting of (1) a biometric scanner, (2) a keypad configured for entry by a user of at least one of alpha and numeric data, (3) a data store containing a personal identification code for a particular user, (4) a data store containing a cryptographic fill key, and (5) a data store containing a cryptographic ignition key. Further, a second one of the security key sub-systems 110, 112, 114, 116, 118 can be selected from the same group. The first and second security key sub-systems can be of the same type, but it can be advantageous to select the second one of the security key subsystems so that it is not the same type of subsystem as the first security key subsystem.

Figure 2:
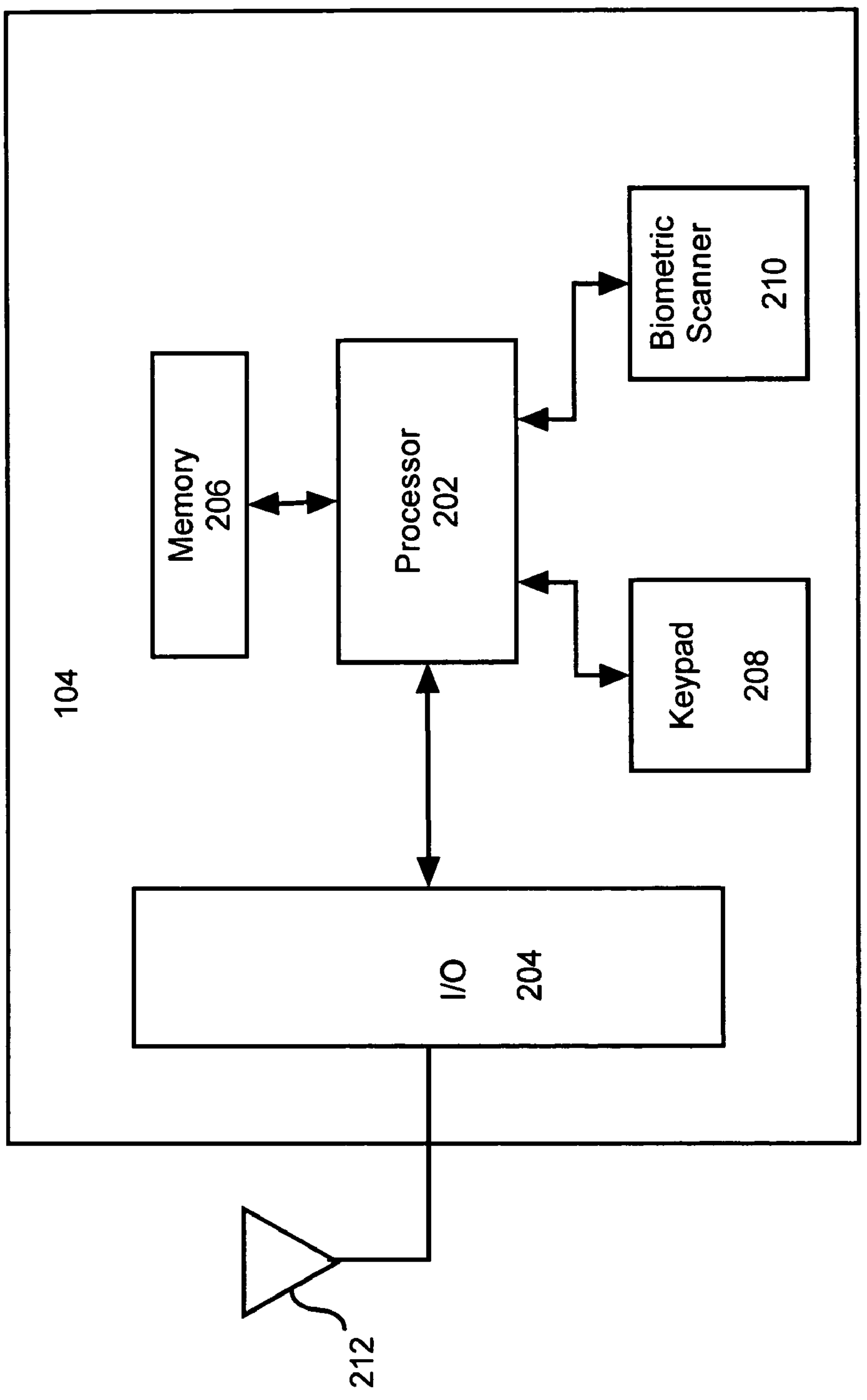
FIG. 2 is a block diagram that is useful for understanding the wireless authentication and access control device in FIG. 1.

Referring now to FIG. 2, there is shown a block diagram that illustrates one of many possible ways that MCD 104 could be implemented. As previously noted any two or more of the security key sub-systems 110, 112, 114, 116, 118 can be entirely separate from one another or can share one or more common hardware and/or software elements. The block diagram in FIG. 2 shows an arrangement in which two or more such sub-systems can be under the control of a common microprocessor device. In FIG. 2, the sub-systems share memory facilities, and I/O facilities.

As shown in FIG. 2 MCD 104 can include a microprocessor 202, I/O system 204, and data store 206. FIG. 2 also shows that MCD 104 can include a keypad 208 and a biometric scanner 210 operatively connected to the microprocessor 202. However, it should be understood that one or both of these components may be omitted, depending on the particular selection of sub-systems that are incorporated into the device.

Microprocessor 202 is capable of receiving and transmitting data through input/output (I/O) subsystem 204, which can include a wireless transceiver, and any other conventional data communication service. A suitable transducer 212 can be provided for any wireless applications. If the I/O subsystem relies on an RF link, the transducer can be an antenna. Alternatively, for an optical based system, an optical transducer can be used. The wireless interface can be based on any of a variety of well known wireless interface standards. Examples of such well known wireless interface standards can include the Bluetooth wireless standard, and the IEEE 802.11 family of standards. However, the invention is not limited in this regard and any other wireless interface standard can be used.

Those skilled in the art will appreciate that the wireless data communications between MCD 104 and controlled resource 102 are subject to interception. Accordingly, it can be advantageous to make use of various cryptographic techniques for the purpose of conducting all or part of such communications. Any suitable cryptographic technique or process can be used for preventing unauthorized use of the information that is transmitted between the two devices.

Microprocessor 202 can be any of a variety of commercially available processor. For example, microprocessor 202 can be selected from the StrongARM or XScale processors (e.g., SA-110 or PXA270) available from Intel Corp. of Santa Clara, Calif., the i.MX or Dragonball family of processors available from Freescale Semiconductor, Inc. of Austin, Tex., or the OMAP family of processors offered for sale by Texas Instruments of Dallas, Tex. Microprocessor 202 can utilize any suitable commercially available operating system. Alternatively, in order to reduce energy consumption and costs, processor 202 can be implemented as a microelectronic controller. Suitable commercially available controllers can include the MCS51 family of microcontrollers available from Intel Corp. of Santa Clara, Calif., the MSP430 family of microcontrollers available from Texas Instruments of Dallas, Tex., or the P87LPC 7xx family of microcontrollers available from Philips Electronics of the Netherlands.

Processor 202 can communicate respectively with data store 206. Data stores 206 can be comprised of any suitable data storage system such as flash memory, read-only memory (ROM), EE PROM and/or dynamic random access memory (DRAM). The operating system for the processor can be stored in non-volatile memory in data store 206. Still, those skilled in the art will appreciate that the invention is not limited with regard to the particular type of data store that is used for the operating system or application software of processor 202.

Suitable data communication links can be provided between the processor 202, data store 206, keypad, 208 and biometric scanner 210. The data communication links can be any suitable type serial or parallel type data channels. For example, if the communication link is a parallel type data link then it can conform to any of a number of well known bus standards, including without limitation ISA, EISA, VESA, PCI, EMIF and so on. Alternatively, if a serial data channel is used, then it can be an I2C, SPI, Microwire, Maxim or other type serial data bus. Those skilled in the art will appreciate that the invention is not limited to any particular data link arrangement among the various components of the AACD 104.

One or more of the authorization access and control sub-systems 110, 112, 114, 116, 118 can be implemented in the AACD 104 that is shown in FIG. 2. For example sub-systems 110, 116, 118 can all make use of predetermined key codes. These key codes can be stored in data store 206. The key codes can be retrieved by processor 202 from data store 206 in response to a particular command signal from the controlled resource 102 or from a user. Thereafter, the processor 202 can automatically cause the key codes to be transmitted to the controlled resource 102.

Security key sub-system 110 can utilize any conventional key code that can be used to identify a user. However, a security key code for security key sub-system 116 can include a cryptographic ignition key (CIK). Those skilled in the art will appreciate that the CIK can be used to enable a secure device when the CIK is loaded into the secure device. Similarly, certain data processing functions of secure devices can require the insertion of a cryptographic key. Accordingly, such a cryptographic fill key can be stored in data store 206 as part of the secure wireless fill key device 118. The wireless capability of the AACD 104, combined with its secure authorization and access control features ensure that only authorized users will be able to make use of the CIK and wireless fill key.

With regard to biometric scanner 210, the key code can be generated as a result of a biometric scan. According to one embodiment, a data file associated with the biometric scan can be communicated to the processor 202. Processor 202 can cause the data file to be directly transmitted to the controlled resource 102 using I/O subsystem 204. In that case, the data file can be evaluated by controlled resource 102 and compared to a database of biometric scan data for the purpose of determining whether the user should be granted access.

According to an alternative embodiment, the key-code for the biometric scan can also be a digital code that is derived from the biometric scanning process. In that case, the digital code can be transmitted to the controlled resource for comparison to a reference file. According to yet another aspect, the biometric scan data can be compared to a reference file contained in data store 206. If the biometric scan data matches the information contained in the reference file, then microprocessor 202 can cause a specific key code to be transmitted to the controlled resource. One advantage of this arrangement would be that it avoids the need to wirelessly transmit biometric scan data.

Regardless of which arrangement is used for the biometric scanner 210, it will be appreciated that any type of biometric scanner can be used. For example, the biometric scanner can be a fingerprint scanner or a retinal scanner. Other types of scanners are also possible and the invention is not limited to these particular scanning types. For example, voice recognition systems can be used for this purpose. Still, the invention is not limited to any particular type of biometric scanner.

Similarly, keypad 208 can record a series of user key strokes indicating a user password. The key strokes can be communicated to the processor 202. In response, processor 202 can communicate the keystroke information to the I/O subsystem 204, which transmits the data to the controlled resource 102. The password can be evaluated by the controlled resource to determine if the user is authorized to access the controlled resource. Alternatively, the AACD 104 can compare the password entered by a user to a password stored in data store 206. If the password is correct, then processor 202 can cause a key code to be transmitted to the controlled resource. The controlled resource 102 can verify that the key code is sufficient to allow the user to access the controlled resource.

Notably, keypad 208 and biometric scanner 210 each provide a means for establishing that the AACD is being utilized by its proper owner. Accordingly, it can be desirable in some instances to use only one of these types of security key sub-systems. In fact, utilizing the combination of these security key sub-systems provides for substantially enhanced security.

Each of the security key sub-systems 110, 112, 114, 116, 118 that are implemented in the AACD 104 can advantageously be arranged to communicate wirelessly with the controlled resource 102. For example, in FIG. 2, a single common wireless I/O subsystem 204 is used by all of the security key sub-systems for enabling wireless communications with the controlled resource 102. The wireless interface system can provide wireless communications with the controlled resource 102 using any of a variety of well known wireless networking standards such as the Bluetooth or IEEE 802.11 family of standards. Alternatively, instead of a single wireless interface, the AACD 104 can optionally include two or more wireless interface subsystems. For example, one or more of the security key sub-systems 110, 112, 114, 116, 118 can use a separate wireless interface system to communicate with the controlled resource 102.

Figure 3:
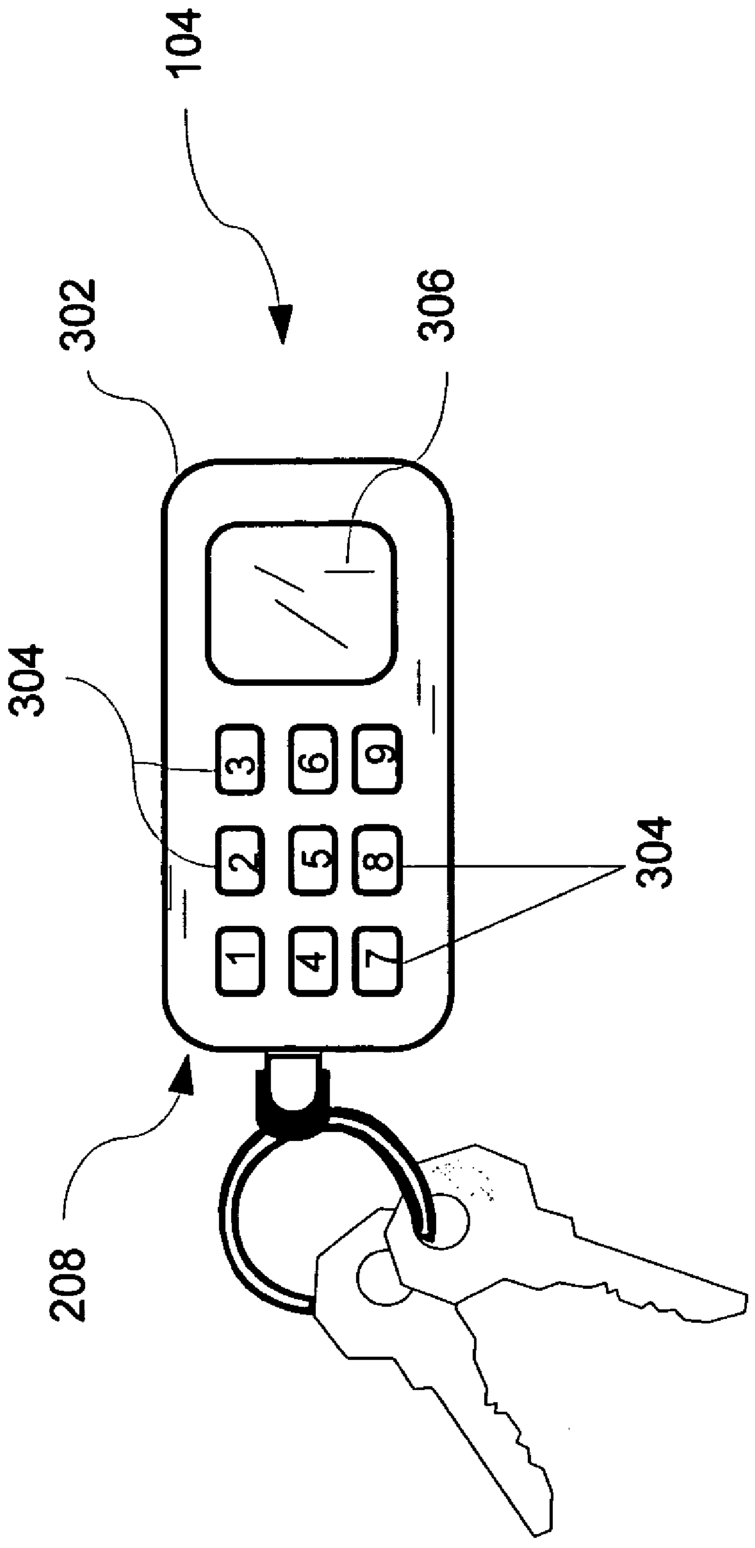
FIG. 3 is a perspective view of a housing that can be used for a wireless authentication and access control device in FIG. 1.

Referring now to FIG. 3, it can be observed that the various security key subsystems incorporated into the MCD 104 can be advantageously implemented in a single compact housing 302. For example, the housing 302 can be sized to fit in a user's pocket or attached to a key chain. Typically this would mean that the device would have an overall size of less than about two cubic inches (2 $inches^3$). The relatively small size of the housing can allow the MCD 104 to be more conveniently carried by a user. Still, it will be appreciated that the invention is not limited in this regard, and any other convenient casing size can also be used. FIG. 3 also shows a plurality of keys 304 associated with keypad 208, and a fingerprint sensor 306 that can be used with biometric scanner 210.

Figure 4:
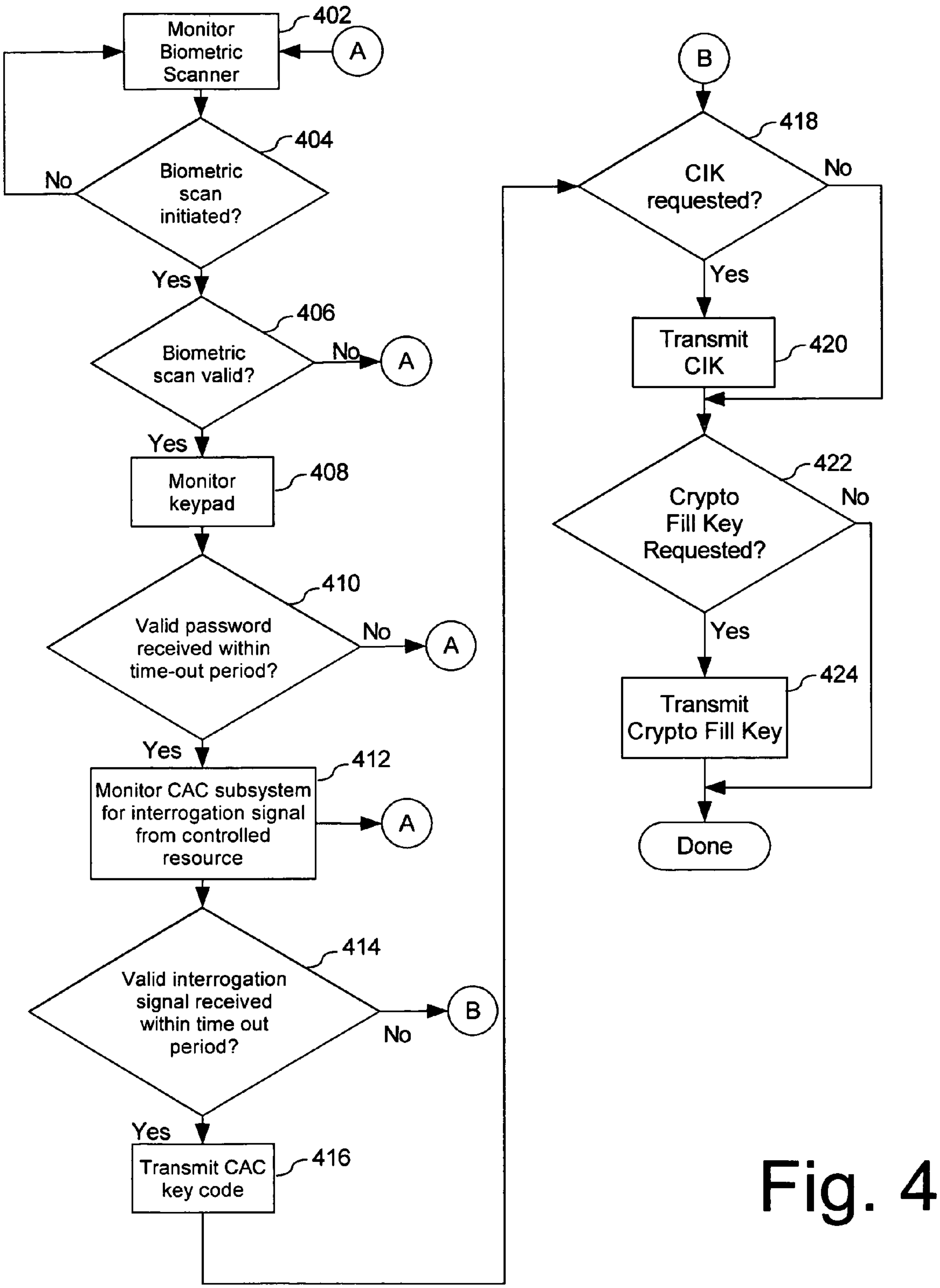
FIG. 4 is a flowchart that is useful for understanding the operation of the wireless authentication and access control device in FIG. 1.

Turning now to FIG. 4 there shown a flowchart that is useful for understanding the operation of the MCD 104. The flowchart is intended to illustrate one possible process for implementing one or more of the security features of the AACD. In this regard, it should be understood that the flowchart is not intended to limit the scope of the invention.

Referring to FIG. 4, a process in the MCD device 104 can begin in step 402 with processor 202 monitoring a biometric scanner 210 to determine if a user has positioned a portion of their body for scanning. If so, then the process can continue in step 404 by initiating a biometric scan. In step 406, processor 202 can evaluate the results of the biometric scan to determine if the scan results correspond to an authorized user of the AACD 104, the controlled resource 102, or both. If the biometric scan results correspond to an authorized user, then the process can continue on to step 408. Otherwise, the processor can return to step 402.

If a keypad 208 is included in the AACD 104, then the process can continue with steps 408 and 410. Otherwise, the process can continue directly to step 414. In step 408, the processor 202 can monitor the keypad for key stroke entry. In step 410, the processor can determine if a valid password has been entered on the key pad. If not, then the processor 202 can return to step 402. However, if a valid password is entered, then the AACD 104 can begin monitoring an input from I/O subsystem 204 to determine if a valid interrogation signal has been received from the controlled resource 102. If, after a period of time, no valid interrogation signal is received in step 414, then the process continues on to step 418. However, if a valid interrogation signal is received, then a common access control (CAC) key code can be automatically transmitted in response by the AACD 104. Alternatively, the AACD can automatically transmit the CAC key code without waiting for an interrogation signal.

In either case, the process can continue on to step 418. In step 418, the processor 202 can determine whether a cryptographic ignition key (CIK) has been requested or is to be transmitted to the controlled resource. A request for the CIK can be transmitted by the controlled resource and received using I/O subsystem 204. Alternatively, the transmission of the CIK can be requested by one or more user keystrokes. Assuming a proper request is received, then the CIK is transmitted in step 420.

Similarly, in step 422, the AACD 104 can determine whether a request has been received for the AACD 104 to transmit a cryptographic fill key. The request can be transmitted to the AACD 104 by the controlled resource, or can be initiated by a series of user keystrokes. If a valid request is received in step 422, then the cryptographic fill key can be transmitted in step 424.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. An authentication and access control device for providing access to a controlled resource, comprising:

a first security key sub-system comprising an interface responsive to a user authentication input and configured to provide a first key code in response to the user authentication input received by said interface, said first key code exclusive of said user authentication input and provided for at least one of authenticating said user of said authentication and access control device and facilitating a use of said controlled resource by said user;

a second security key sub-system configured to provide a second key code exclusive of said first key code for at least one of authenticating said user and facilitating a use of said controlled resource by said user; and a wireless communication system comprising at least one wireless transmitter coupled to said first security key sub-system and said second security key sub-system, said wireless transmitter configured to automatically communicate at least said first key code wirelessly to said controlled resource if an authentication positively verifies an identity of said user;

wherein said authentication and access control device is a compact pocket-sized housing worn or carried on said user, and said first and second security key subsystems being implemented in said compact pocket-sized housing; and wherein said user authentication input is not communicated from said wireless communication system to said controlled resource.

2. The authentication and access control device according to claim 1, wherein said first security key sub-system is selected from the group consisting of (1) a biometric scanner, (2) a keypad configured for entry by a user of at least one of alpha and numeric data, (3) a data store containing a personal identification code for a particular user, (4) a data store containing a cryptographic fill key, and (5) a data store containing a cryptographic ignition key, and said second security key sub-system is selected from the same group exclusive of a security key sub-system selected from said group for said first security key sub-system.

3. The authentication and access control device according to claim 2, wherein said biometric scanner determines at least one of said first key code and said second key code based on a biometric scan of said user.

4. The authentication and access control device according to claim 2, wherein at least one of said first key code and said second key code is determined by a pattern of keystrokes entered by said user on said keypad.

5. The authentication and access control device according to claim 1, wherein said controlled resource is a data processing device.

6. The authentication and access control device according to claim 5, wherein at least one of said first key code and said second key code is a cryptographic key, and said cryptographic key enables selected cryptographic data processing to be performed using said controlled resource.

7. The authentication and access control device according to claim 5, wherein at least one of said first key code and said second key code is a cryptographic ignition key, and said cryptographic ignition key enables at least one data processing function of said controlled resource.

8. The authentication and access control device according to claim 1, wherein said second key code is automatically communicated from said wireless communication system in response to a stimulus signal received at said authentication and access control device from a security system associated with said controlled resource.

9. An authentication and access control device for providing access to a personal electronic device, comprising:

a first security key sub-system comprising an interface responsive to a user authentication input and configured to provide a first key code in response to said user authentication input received by said interface, said first key code exclusive of said user authentication input and provided for at least one of authenticating said user of said authentication and access control device and facilitating a use of said personal electronic device by said user;

a second security key sub-system configured to provide a second key code exclusive of said first key code for at least one of authenticating said user and facilitating a use of said personal electronic device by said user; and a wireless communication system comprising at least one wireless transmitter coupled to said first security key sub-system and said second security key sub-system, said wireless transmitter configured for automatically transmitting at least one wireless signal to said personal electronic device based on said first key code and said second key code, said wireless signal containing information for at least one of authenticating said user to said personal electronic device and facilitating a use of said personal electronic device;

wherein said authentication and access control device is a compact pocket-sized housing worn or carried on said user, and said first and second security key subsystems being implemented in said compact pocket-sized housing; and wherein said user authentication input is not transmitted from said wireless communication system to said personal electronic device.

10. The authentication and access control device according to claim 9, wherein said first security key sub-system is selected from the group consisting of (1) a biometric scanner, (2) a keypad configured for entry by a user of at least one of alpha and numeric data, (3) a data store containing a personal identification code for a particular user, (4) a data store containing a cryptographic fill key, and (5) a data store containing a cryptographic ignition key, and said second security key sub-system is selected from the same group exclusive of a security key sub-system selected from said group for said first security key sub-system.

11. The authentication and access control device according to claim 9, wherein said wireless communication system is configured for transmitting a first wireless signal based on said first key code and a second wireless signal based on said second key code.

12. The authentication and access control device according to claim 9, wherein said personal electronic device is responsive to a single wireless signal based on said first key code and said second key code for enabling said personal electronic device.

13. The authentication and access control device according to claim 10, wherein said biometric scanner is configured for determining at least one of said first key code and said second key code responsive to a biometric scan of a user.

14. The authentication and access control device according to claim 10, wherein at least one of said first security key sub-system and said second security key subsystem is responsive to a pattern of keystrokes entered by a user on said keypad for determining at least one of said first key code and said second key code.

15. The authentication and access control device according to claim 10, wherein said cryptographic key is at least one of said first key code and said second key code, and wherein said cryptographic key enables selected cryptographic data processing to be performed using said personal electronic device.

16. The authentication and access control device according to claim 10, wherein said cryptographic ignition key enables at least one data processing function of said personal electronic device.

17. An authentication and access control device for providing access to a personal electronic device, comprising:

a first security key sub-system including a biometric scanner that is responsive to a user authentication input and configured to generate a first key code in response to said user authentication input received by said biometric scanner, said first key code exclusive of said user authentication input and contains information required for permitting a user access to a controlled resource; and a wireless communication system comprising at least one wireless transmitter coupled to said first security key sub-system for wirelessly transmitting said first key code to said personal electronic device;

wherein said authentication and access control device is a compact pocket-sized housing worn or carried on said user, and said first security key sub-system being implemented in said compact pocket-sized housing; and wherein said user authentication input is not transmitted from said wireless communication system to said personal electronic device.

18. The authentication and access control device according to claim 17, further comprising at least a second security key sub-system including at least one electronic circuit for providing a second key code different from said first key code for at least one of authenticating said user to said personal electronic device and enabling at least one data processing function of said personal electronic device.

19. The authentication and access control device according to claim 18, wherein said at least one wireless transmitter is configured for also transmitting said second key code to said personal electronic device.

20. The authentication and access control device according to claim 19, wherein said second key code is selected from the group consisting of (1) a cryptographic key, (2) a cryptographic ignition key and (3) a personal identification code.

* * * * *